Oct. 10, 1950     W. T. ANDRUS     2,524,871
APPARATUS FOR PREPARING SEED BEDS AND SEEDING SAME
Filed June 8, 1945     5 Sheets-Sheet 4

Patented Oct. 10, 1950

2,524,871

UNITED STATES PATENT OFFICE 2,524,871

APPARATUS FOR PREPARING SEED BEDS AND SEEDING SAME

William T. Andrus, Ann Arbor, Mich.

Application June 8, 1945, Serial No. 598,344

8 Claims. (Cl. 111—1)

The present invention relates to farm implements, and more particularly to a combined soil treating, cultivating, rolling and seed planting apparatus.

The primary object of the invention is to provide an apparatus which will completely condition the soil and simultaneously plant and seed the same in a single operation, whereby the use of various separate implements such as cultivators, seeders, rollers and the like will be eliminated with a considerable saving in time and labor.

Another object of the invention is to provide an apparatus which will simultaneouly cultivate the soil, transfer the top soil beneath a layer of subsoil and finally roll the top soil so that the transferred subsoil may be conditioned for planting, whereby large areas and tracts of land may be conditioned, treated and planted in a minimum amount of time with a great saving in labor and farming costs.

Another object of the invention is to provide a farming apparatus in which the top or surface soil is removed to a predetermined depth and conveyed rearwardly where it is placed on a surface from which subsoil has been removed so that the subsoil may likewise be conveyed rearwardly and deposited on the previously deposited layer of top soil, whereby the top soil layer will be lowermost and the subsoil layer will be arranged uppermost for subsequent planting and seeding.

Another object of the invention is to provide a farm implement and machine which is adapted to remove the top soil containing stubble and the like so that it may be placed in a trench or pathway from which a predetermined amount of subsoil has been removed so that the subsoil may be conveyed to a position for being distributed over the top soil and thereby condition the soil for planting with the top soil containing vegetable matter lowermost and the subsoil layer uppermost.

Another object of the invention is to provide a farm implement and apparatus which will remove a predetermined amount of top soil and position the same in a pathway in advance of a land roller so that the layer of subsoil removed from said pathway may be deposited on the rolled layer of top soil, whereby the vegetation-containing top soil will ferment and decay to thus fertilize the layer of superposed sub-soil.

Another object of the invention is to provide a farm apparatus as above set forth in which means is provided for planting and seeding the superposed layer of subsoil after the same has been evenly distributed over the layer of top soil.

Another object of the invention is to provide a farming machine and apparatus of the above-mentioned type which is mounted on a wheeled frame and in which the soil treating and conditioning apparatus as well as the land rolling and planting equipment is duplicated at each end of the wheeled frame to facilitate travel of the farming apparatus to and fro along parallel pathways without necessitating reversing the position of the apparatus when the end of the pathway has been reached.

Another object of the invention is to provide a farming apparatus of the above-mentioned type in which all of the equipment necessary to condition, treat and cultivate the soil, roll and plant the same after conditioning, is mounted on a single wheeled frame structure having combined running and steering gear at each end thereof to facilitate movement of the wheeled frame laterally from one row or pathway to the next row when the apparatus has reached the end of a pathway being farmed.

Another object of the invention is to provide a farming and land conditioning apparatus in which the sets of soil conditioning and rolling equipment at each end of the wheeled frame may be individually controlled by suitable hydraulic control mechanism so that one set of equipment will be elevated out of ground engagement while the other set is employed, thus enabling the farming equipment to be moved to and fro along adjacent runs or pathways without reversing the apparatus and necessitating turning the same in a forward direction each time the apparatus reaches the end of said row or pathway.

Another object of the invention is to provide an apparatus for soil treatment and cultivation in which the top or surface soil is first cut into slices by disc harrows and then removed by means of a toothed scoop arranged rearwardly of the harrow disc and in advance of an endless apron conveyor which is adapted to receive said soil so as to elevate the same and convey the soil rearwardly for being deposited in front of a land roller in a pathway or trench formed by a harrow and scoop positioned rearwardly of the first set of harrow discs and scoops. Thus the surface or top soil is rolled in a trench or pathway from which the subsoil has likewise been removed so that after the top soil has been rolled, the subsoil will be placed thereon and distributed thereover for being planted or seeded.

Another object of the invention is to provide an apparatus for soil treatment, conditioning and planting or seeding in which the various elements are arranged so as to be successively elevated as the apparatus reaches the end of a pathway so that the plot being conditioned, treated, planted or seeded will be uniform in length and each pathway will end abruptly with an adjacent pathway.

Another object of the invention is to provide an apparatus for conditioning, treating and planting or seeding farm land in which all of the various elements are adapted to be raised by means of a hydraulic control system so arranged as to permit the leading harrow to be elevated out of ground engagement by a manual control valve to initiate operation of the system so that the remaining elements will be successively elevated by the hydraulic control system automatically at a predetermined location along said pathway.

Another object of the invention is to provide an apparatus for soil treatment and conditioning of the above-mentioned type in which a power source such as a prime mover is provided for driving the traction wheels as well as the various conveying elements for both sets of equipment and to provide a source of power for the pump of the hydraulic control system and the steering mechanism.

Other objects and advantages of the invention will become apparent during the course of the following description of the accompanying drawings, wherein.

In the drawings, the reference character 6 will generally be employed to indicate an implement frame having end frame portions 7 and 8 (Figure 6) provided with traction and steering wheels 9 and 10 respectively.

Figure 6:
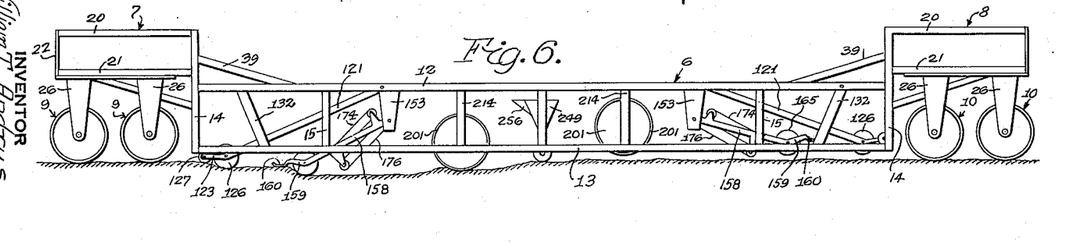
Figure 6 is a side elevational view of the entire structure showing the manner in which the soil treating apparatus is duplicated at each end of the implement frame and illustrating one set in operation while the other set is elevated above the ground level.

As illustrated in Figure 6, the structure and apparatus at each end thereof extending from the center is identical and hence, a description of one end of the combined soil treating, conditioning and planting or seeding apparatus will suffice for both.

Figures 2, 12:
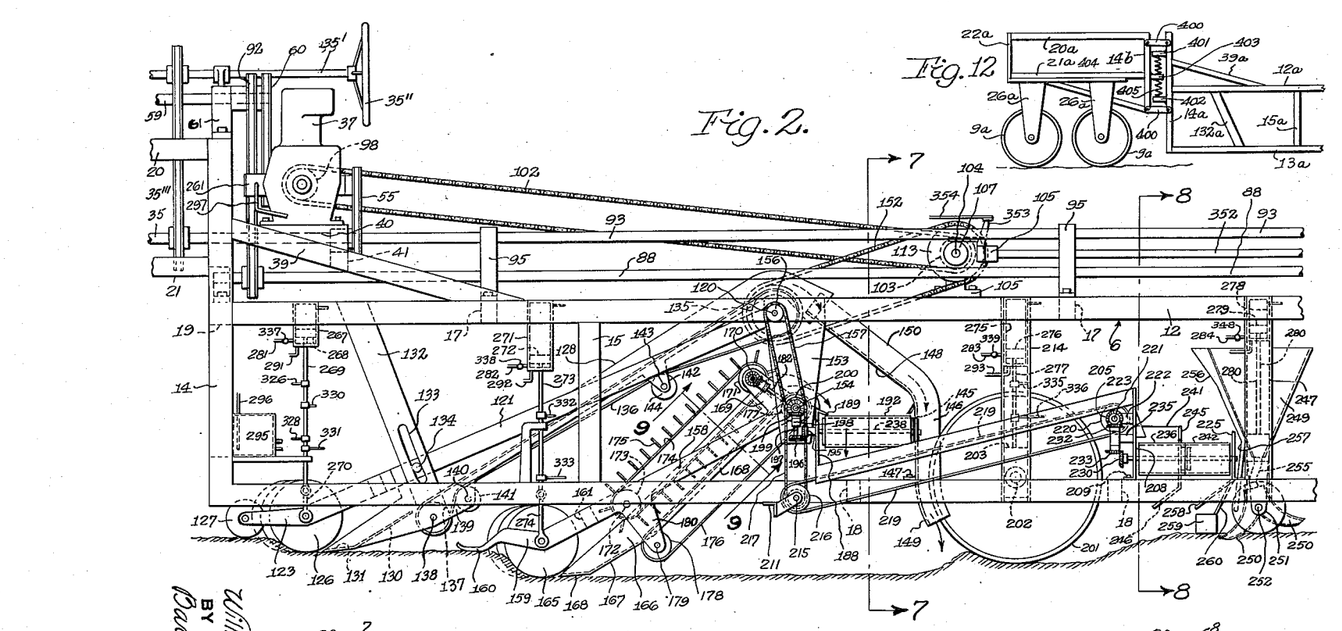
Figure 2 is a side elevational view of one end of the apparatus for treating and conditioning soil, further showing the arrangement of the various elements and the manner in which they are disposed so as to operate in succession during use.
Figure 12 is a fragmentary side elevational view of a modified form of the invention in which the traction wheels are arranged for yieldingly supporting the implement frame to compensate for unevenness in terrain and absorb shocks which would otherwise be transmitted to the implement frame.
Figures 3, 4, 5, 9:
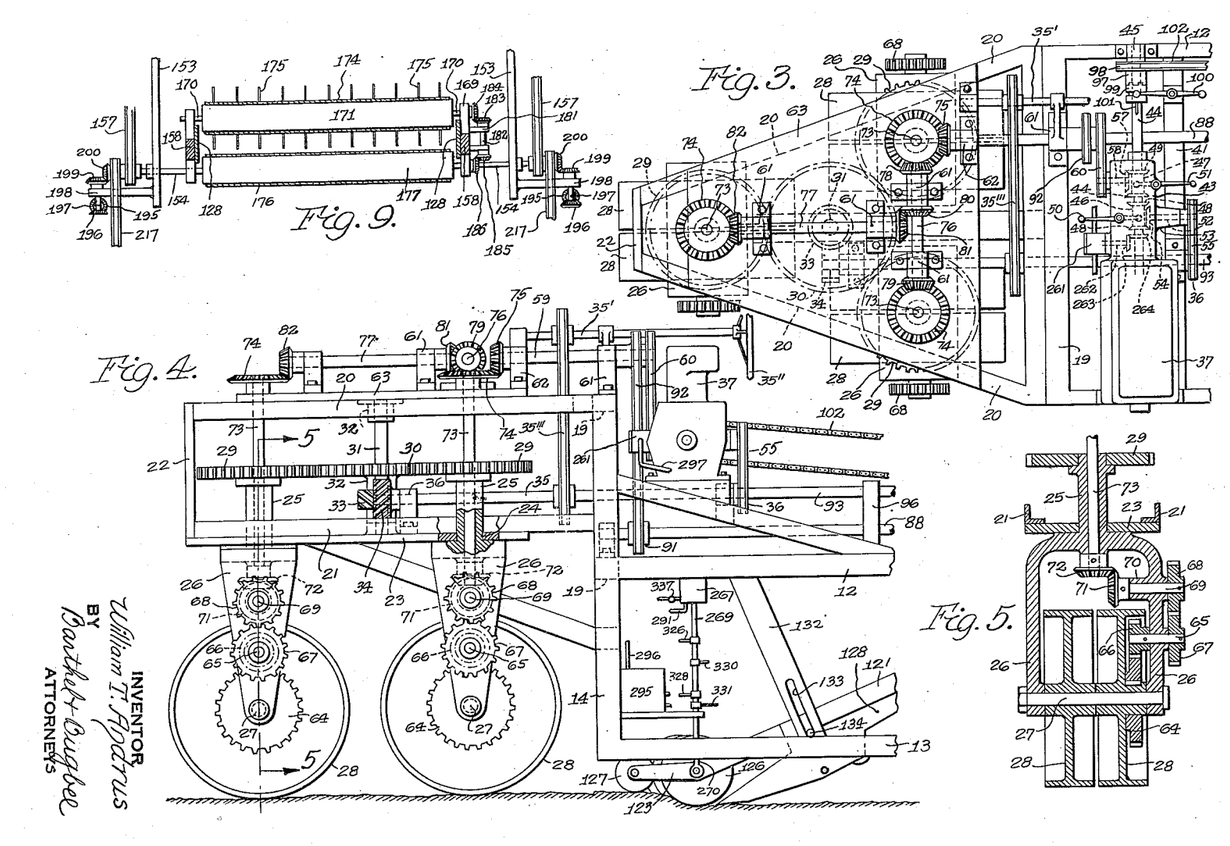
Figure 3 is a fragmentary top plan view of an end portion of the implement frame showing the combined traction and steering mechanism therefor.
Figure 4 is a fragmentary side elevational view of the front portion of the implement frame showing the arrangement of the traction and steering wheels as well as the drive mechanism therefor.
Figure 5 is a vertical cross sectional view taken on line 5—5 of Figure 4 looking in the direction of the arrows and illustrating the gearing for drivingly connecting the power source to the traction wheels.
Figure 9 is a diagonal cross-sectional view taken on line 9—9 of Figure 2 looking in the direction of the arrows and showing the manner in which the apron elevator or conveyor is adapted to be driven to elevate the subsoil for being deposited rearwardly of the land roller.

As illustrated in Figures 2 and 3, the implement frame 6 comprises upper and lower frame bars 12 and 13 arranged on each side of the apparatus and connected by vertical end bars 14 at the ends thereof as well as intermediate frame bars 15. Transversely extending frame bars 17 and 18 connect the upper and lower frame bars 12 and 13 and suitable end bars 19 likewise connect the upper and lower side frame bars 12 and 13 respectively.

The wheel supporting frames 7 and 8 at each end of the implement frame 6 are constructed of upper and lower frame bars 20 and 21 which are connected to the end bars 14 and the free ends of the upper and lower frame bars 20 and 21 converge and are connected by a transverse plate 22. The lower converging frame bars 21 are connected by the bottom plate 23 and each plate is provided with openings 24 which are triangularly arranged as shown in Figure 3 for receiving the tubular spindle portion 25 of the wheel-supporting steering yokes 26 having an axle 27 for supporting a pair of traction wheels 28. The upper end of each of the tubular spindle portions 25 is fitted with a gear wheel 29 adapted to be drivingly engaged by the common gear wheel 30 secured to a shaft 31 having one end journaled in a suitable bearing 32 supported by the upper frame members 20 while the lower end is journaled in a similar bearing supported by the triangular plate 23. The hub 32a of the gear wheel 30 is fitted with a spur gear 33 having diagonal teeth which are adapted to be drivingly engaged by a similar gear 34 mounted on a shaft 35 and journaled in a suitable bearing 36 secured to the triangular-shaped frame plate 23. The shaft 35 extends rearwardly and is provided with a gear wheel 36' (Figure 3) for being driven by the prime mover such as a motor 37. The motor 37 is mounted on the implement frame 6 and is supported on one of the truss members thereof as at 39 by being bolted or fastened to a block 40 as illustrated in Figure 2, as well as being secured to a transverse frame bar 41 extending between the truss bars 39 connecting the upper side frame bars or rails 12 with the end frame bars 14. The motor 37 is provided with a transmission housing 43 through which the power shaft 44 extends so that the free end thereof may project beyond said transmission housing and be supported in a bearing 45 carried by one of the upper frame bars 12 of the implement frame. The motor drive shaft 44 has keyed thereon the hubs 46 and 47 of reversing gears 48 and 49 which are adapted to be controlled by suitable yoke arms having lever extensions 50 and 51 respectively. The reversing gears 48 on the hub 46 are adapted to be drivingly connected to a shaft 52 extending through a bearing extension 53 on the transmission housing 43 and said shaft is provided with a gear 54 which is adapted to be alternately engaged by either one of the gears 48 on the hub 46 so as to rotate the shaft 52 in either direction. The shaft 52 is provided with a suitable sprocket wheel over which is trained a sprocket chain 55 so as to drive the sprocket 36' on the steering shaft 35. By manipulating the control handle 50 it will be seen that the power source or motor 37 will be drivingly connected to the steering shaft 35 so as to rotate the wheel supporting steering yokes 26 about the axis of their tubular supporting portions 25.

The drive shaft 35 extends rearwardly to the opposite end of the implement frame and is adapted to steer the steering wheels 10 thereof in substantially the same manner as described in connection with the steering wheel 9.

The other set of reversing gears 49 are adapted to be drivingly connected to a gear wheel 57 mounted on a shaft 58 extending through the transmission housing 43 in such a manner as to drive a power shaft 59 having a sprocket wheel and chain connection 60 with the shaft 58. One end of the shaft 59 is journaled in a bearing support 61 affixed to the horizontal frame bar 19 while the other end is journaled in a similar bearing support 62 carried by a triangular-shaped plate 63 which extends between and connects the upper converging frame bars 20 of the wheel supporting frame 7. The power shaft 59 is adapted to drivingly connect the motor 37 with the traction wheels 9 and also with the traction wheels 10 in a manner which will be hereinafter more fully described, and in order to provide a drive for each of the traction wheels, a gear wheel 64 is keyed to the hub of one of the pair of traction wheels 28 as indicated in Figure 5. A rotary shaft 65 is mounted in a suitable bearing opening in one of the arms of the steering yoke 26 and has keyed to one end a spur gear 66 which is in mesh with the gear wheel 64 while the other end is provided with a similar spur gear 67 in driven engagement by a spur wheel 68 mounted on a shaft 69 directly above the shaft 65 and likewise extending through a bearing opening in a bearing boss 70 of one of the arms of the steering wheel 26. The inner end of the shaft 69 is fitted with a bevel gear 71 which is in mesh with a bevel gear 72 mounted on the lower end of a drive shaft 73 which extends through the tubular yoke support 25 and projects a considerable distance thereabove so as to extend through suitable bearing openings and bearings in the triangular-shaped plate 63.

In order to drive all of the traction wheels 28 from the power shaft 59, the upper ends of the drive shaft 73 are provided with bevel gears 74 which are rigidly secured in place and are adapted to be driven through a series of shafts and bevel gears. The power shaft 59 is provided with a bevel gear 75 which is arranged in driving engagement with one of the bevel gears 74 (Figure 3) and the remaining bevel gears 74 are adapted to be driven by connecting shafts 76 and 77 which are journaled in suitable bearings connected with the triangular-shaped plate 63 adjacent each end thereof. The shaft 76 is provided on one end with a bevel gear 78 which is in driven engagement with the bevel gear 74 driven by the bevel gear 75 and the other end of the shaft 76 has affixed thereto a bevel gear 79 in driving engagement with an adjacent bevel gear 74. The intermediate portion of the shaft 76 has keyed thereto the bevel gear 80 which is in mesh with a bevel gear 81 on the shaft 77 so as to rotate the shaft 77 and the third bevel gear 74 through the medium of an intermeshing bevel gear 82.

It is intended to drive the traction wheels 9 and 10 at each end of the wheel frame in unison and in order to accomplish this, the power shaft 59 is adapted to be connected to a similar power shaft on the wheel supporting frame 8 by means of a longitudinally extending shaft 88 which is driven from the power shaft 89 through the medium of sprocket wheels 90 and 91 which are connected by a sprocket chain 92. A similar sprocket and sprocket chain will be provided for the opposite end of the shaft 88 for drivingly connecting the shaft 88 to a shaft similar to the power shaft 59 on the wheel supporting frame 8.

In a similar manner, the steering shaft 35 may be connected to a similar steering shaft carried by the wheel-supporting frame 8 by means of an extension 93 (Figure 4). The longitudinally extending power and steering shafts 88 and 93 may be supported throughout their length by suitable bearing brackets 95 and 96 respectively, extending upwardly from the transverse frame bar 17 connecting the upper side rails or frame bars 12. A manual steering control shaft 35' is journaled in the bearing support 62 and is provided at one end with a hand wheel 35'' and at the opposite end with a sprocket wheel which is drivingly connected to the steering shaft 35 through the medium of a sprocket chain 35'''.

Mounted on the free projecting end of the power shaft 44 of the motor 37 (Figure 3) is a hub 97 of a sprocket wheel 98 which is free to rotate thereon and adapted to be connected to the shaft 44 by means of a slide clutch 99 having a control yoke and operating handle 100 so that when the clutch 99 is in engagement with the teeth on the hub 97 of the sprocket wheel 98, the power shaft 44 will be directly connected to the sprocket wheel 98 since the clutch sleeve 99 is keyed to the shaft by means of a key 101. Trained over the sprocket wheel 98 is a sprocket chain 102 which extends rearwardly and is trained over a sprocket wheel 103 (Figure 1) mounted on a shaft 104 journaled in a suitable bracket 105 secured to and extending upwardly from one of the frame side rails 12. The sprocket 103 is loosely mounted on the shaft 104 and is provided with a sleeve 106 (Figure 10) which is integrated therewith and is formed as an extension of the hub of the sprocket wheel 103. One end of the shaft 104 is provided with a hub 107 (Figure 7) of a clutch member having teeth 108, while the other end is retained in place in a bearing opening 109 of the bearing support 105 by means of the hub 110 of the bevel gear 111. Rotatably mounted on the sleeve 106 is the hub 112 of a sprocket wheel 113 having clutch teeth 114 formed on the hub thereof and disposed in a direction opposite to the clutch teeth 108 and clutch hub 107. Keyed to the sleeve 106 is a clutch collar 115 which is provided with clutch teeth 108 and 114 on the clutch hub 107 and hub 112 of the sprocket wheel 113. The clutch sleeve 115 is movably mounted on the sleeve 106 for longitudinal movement by means of a key 117 and is prevented from relative rotary movement with respect to the sleeve 106 by said key, so that rotation of the sprocket wheel 103 from the power source or motor 37 through the sprocket chain 102 may cause the sleeve 106 to be drivingly connected to the sprocket wheel 113 or the bevel gear 111.

Extending between the upper side frame rail 12 and rotatably mounted in suitable bearings therein is a rotary shaft 120 upon which is mounted to swing vertically a cultivator supporting frame, including side rails 121 which have their upper ends apertured to be received on the transversely extending rotary shaft 120 as indicated in Figure 2. The lower ends of the rails 121 are connected by the transverse bar 122 and extensions thereon as at 123 project forwardly and approximately parallel to the ground surface over which the implement is travelling. Extending forwardly from the transverse rail 122 of the cultivator supporting frame is an arm 124 for cooperating with the extension 123 and providing a central support for a pair of disc harrow shafts 125 having a series of equidistantly spaced disc harrows 126 mounted thereon. The outer ends of the disc harrow shaft 125 are journalled in suitable bearings in extensions 123 and similarly, the inner ends are supported in the arm 124 by slightly angled bearings. The extreme free ends of the extensions 123 are provided with ground-engaging rollers 127 to support the harrow discs 126 at a predetermined depth.

Secured to the side frame rails of the disc harrow supporting frame is a pair of side plates 128 which are pivoted on the transversely extending rotary shaft 120 at the top thereof in substantially the same manner as the disc harrow frame supporting rail 121. The side plates 128 may be secured to the side rails 121 of the disc harrow supporting frame by welding or the like and the lower ends of the rails are connected by a transversely extending plate 130, the forward end of which is provided with a series of spaced teeth 131 which are angled slightly with respect to the transversely extending plate 130 to extend in a direction tangentially to the disc harrows 126 (Figure 2) and provide a scoop or shovel directly rearwardly thereof. A pair of diagonally disposed truss bars 132 connect the upper and lower side rails of the implement frame 12 and 13 respectively and are provided with elongated arcuately curved slots 133 for receiving guide pins 134 extending laterally from the side rails 121 of the disc harrow supporting frame.

Secured to the transversely extending rotary shaft and mounted between the frame plates 128 is a roller 135 for supporting a conveyor apron 136 the lower end of which passes over a similar roller 137 mounted on a shaft 138 which has its ends journaled in depending extensions 139 at the lower end of the side plates 128. Also journaled in the depending extensions 139 is a shaft 140 of an idle roller 141 which is adapted to engage the underside of the conveyor apron adjacent the roller 137 and maintain the apron in a taut condition. Also depending from the side plates 128 is a roller supporting bracket 142 having a shaft 143 upon which is mounted an idle roller 144 for engaging the underside of the conveyor apron 136 in the vicinity of the conveyor roller 135. It will thus be seen that the top soil of the land surface will be cut into narrow strips by the harrow disc 126 so that they will be fed onto the transversely extending plate 130 rearwardly thereof and thence conveyed by the conveyor apron 136 upwardly and rearwardly in the direction of the arrows (Figure 2).

Extending between the lower side rails 13 of the implement frame is a vertical plate 145 which has lateral extensions 146 provided with suitable lugs 147 for being fastened or affixed to the side rails 13 by means of screws or bolts and the like. The upper end of the vertically extending plate 145 extends upwardly and forwardly as at 148 and provides a chute for receiving the elevated top soil so that the same may fall by gravity after being elevated to the discharge portion 149 of the plate 145 directly in front of a land roller which will be presently described. The upper end of the chute 148 is disposed between the upper widened portion of the side plates 128 so as to receive the soil from the discharge end of the apron conveyor 136. Upwardly extending flanges 150 are formed on the chute 148 at each side thereof to prevent the soil from falling laterally over the edges of said chute.

Mounted on one end of the transversely extending rotary shaft 120 is a sprocket wheel 151 over which is trained a sprocket chain 152 for being driven by the sprocket wheel 113 so that when the clutch collar 115 (Figure 10) is shifted to the left, with the clutch teeth 114 in driving engagement with the clutch teeth 116, power will be transmitted from the motor 37 to the conveyor apron 136.

Secured to the upper side frame rails 12 and depending therefrom on each side is a pair of bracket plates 153 through which the rotary shaft 120 also extends at the upper end thereof, and supported by the lower ends of said depending bracket plates 153 is a transversely extending rotary shaft 154 which is provided with sprocket wheels 155 at each end thereof for being connected to the transversely extending rotary shaft 120 by means of a similar sprocket wheel 156 at each end thereof. A sprocket chain 157 is trained over the sprocket wheels 155 and 156 so as to impart rotation to the transversely extending rotary shaft 154 upon rotation of the transversely extending rotary shaft 120.

Supported on the transversely extending rotary shaft 154 is a disc harrow cultivator frame having side bars or rails 158 which are mounted on the transversely extending shaft 154 so as to swing vertically in substantially the same fashion as the side rails 121 of the previously described cultivator frame. The lower ends of the cultivator supporting rails 158 are angled to extend forwardly as at 159 and terminate in ground engaging foot portions 160 for engaging the ground surface or pathway from which the top soil has been removed or cut by the harrow discs 126. The lower ends of the disc harrow supporting frame bars 158 are connected by a transversely extending bar 161 which has formed centrally thereof a forwardly projecting arm 162 for supporting the inner ends of harrow shafts 163. The outer ends of the harrow shafts 163 are supported in suitable bearings in the frame bars 158 and similarly to the shaft 125 are angled relatively one to the other in a forwardly converging fashion. A series of harrow discs 165 is mounted on the shafts 163 in spaced apart relation similar to the harrow discs 126.

Secured to the side rails 158 is a pair of frame plates 166 which may be affixed or fastened in place by welding or riveting, and said plates are arranged diagonally with respect to the side frame rails 158 and are connected at their lower ends by a transversely extending plate 167 similar to the plate 130. The forward end of the transversely extending plate 167 is provided with a series of teeth 168 which extend in the direction of the harrow discs 165 and are adapted to remove or sweep the subsoil from the trench or pathway formed by the shovel or scoop teeth 131. Arm extensions 169 are formed at the upper ends of the side frame rails 168 and are adapted to support the rotary shaft 170 to which is secured a conveyor roller 171. Similarly supported between the side frame rails 158 adjacent the lower ends thereof is a rotary shaft 172 upon which is mounted a conveyor roller 173. A conveyor apron 174 is trained over the rollers 171 and 173 and is provided with a series of spaced apart cleats 175 for assisting in conveying the subsoil upwardly on a lower conveyor apron 176 which is trained over a roller 177 on the transversely extending rotary shaft 154 and has its lower end similarly trained over a conveyor roller 178 which is mounted on a shaft 179 the ends of which are journaled in depending brackets 180 formed integral with the side frame rails 158. Thus it will be seen that the subsoil will be removed by the scoop or shovel plate 167 and will be conveyed upwardly by the conveyor apron 176 and over the apron conveyor roller 177 in the direction of the arrows, so as to fall upon transversely extending conveyor aprons which move from the central portion of the machine toward each side thereof in a manner which will be hereinafter more clearly described. Bearing brackets 181 are formed integral with the arm extensions 169 and are adapted to support a rotary shaft 182 one end of which is fitted with a bevel gear 183 which is drivingly connected to a bevel gear 184 on the shaft 170 of the conveyor roller 171. The other end of the shaft 182 is provided with a bevel gear 185 which is adapted to be driven by a bevel gear 186 on the shaft 154. It will thus be seen that the conveyor rollers 171 and 172 will be driven through the bevel gears 186, 185 and shaft 182 and bevel gears 183 and 184 in opposite directions so that the adjacent courses of the conveyor aprons 174 and 176 travel in the same directions. Preferably, the conveyor apron 174 carrying the pins 175 is arranged to travel at an increased speed relative to the conveyor apron 176 so that the soil will be broken up and scarified before being conveyed rearwardly.

Extending transversely of the implement frame and secured to the lower side rails 13 is a vertical plate 188 the upper end of which is angularly bent as at 189 to form a relatively short trough or chute for receiving the subsoil as the same is conveyed upwardly on the conveyor apron 176, and passed over the upward conveyor roller 177. Journaled adjacent the ends of the vertical plate 188 are the ends of a pair of conveyor roller supporting shafts 190 which have their other ends journaled in the laterally extending projections 146 of the vertical chute plate 145. Conveyor rollers 191 are mounted on the shafts 190 over which is trained a pair of conveyor aprons 192 which have their inner ends supported on conveyor rollers 193 in a horizontal plane with the conveyor rollers 191. Conveyor roller supporting shafts 194 are arranged in spaced apart relation for supporting the conveyor rollers 193 and have their ends journaled in suitable bearings in the vertical plate 145 as well as the transversely extending vertical plate 188. Thus it will be seen that the subsoil will fall upon the conveyor aprons 192 so as to be directed laterally to each side of the implement frame as indicated by the arrows in Figure 1. One end of each of the outer conveyor roller supporting shafts 190 is provided with a bevel gear 195 which is in driven engagement with a bevel gear 196 mounted on the lower end of a vertical shaft 197 and supported in a suitable journal bearing 198 extending laterally from the depending bracket plates 153. The upper end of the shaft 197 is provided with a bevel gear 199 which is adapted to be driven by a bevel gear 200 on the transversely extending rotary shaft 154. It is to be noted that the vertical shafts 197 at each side of the implement frame will be driven in reverse direction so that the outermost conveyor rollers 191 will be driven in reverse direction through the medium of the bevel gearing above described from the transversely extending shaft 154.

A land roller 201 is mounted rearwardly of the laterally extending conveyor apron 192 and is supported on a shaft 202 the ends of which are mounted in slide bearing blocks 203 vertically movable in channel guides 204 at each side of the implement frame connecting the upper and lower frame rails 12 and 13.

It is to be noted that the vertical frame plate 188 extending transversely of the lower side frame rails 13 projects a considerable distance beyond the sides of the implement frame and the ends of said transversely extending vertical plate are provided with upwardly and rearwardly extending side bars 205 arranged on opposite sides of the land rollers 201. Similarly, the projecting ends of the vertical plate 145 as at 146 have connected therewith upwardly and rearwardly extending frame portions 207 which are connected at their rearmost portions by means of a transversely extending vertically arranged plate 208 the lower end of which is angled and adapted to be secured to the lower side frame rails 13 by means of a screw or the like as at 209. The uppermost ends of the frame plates 205 and 207 are connected by arm extensions 210 projecting laterally from the vertical plate 208. Secured to the under side of the lower implement frame rail 13 is an angle bar 211 the ends of which extend on both sides of the implement frame as at 212 and said extensions 212 are provided with shaft-supporting brackets 213 at the extreme ends thereof and intermediate shaft supporting brackets 214 slightly spaced from the brackets 213 for supporting a conveyor roller shaft 215. Conveyor rollers 216 are mounted on the shaft and the inner ends of the shafts are provided with suitable sprocket wheels over which is trained a sprocket chain 217 the upper end of which is likewise trained over a sprocket wheel 218 on each end of the transversely extending shaft 154. Conveyor aprons 219 are trained over the conveyor rollers 216 and have their upper ends passing about similar conveyor rollers 220 which are mounted on shafts 221 the ends of which are journaled in spaced bearing brackets 222 extending forwardly from the vertically extending transversely arranged plate 208. One of the ends of the shafts 221 projects outwardly from the outer frame member 205 and has secured thereto a bevel gear 223.

Figures 7, 8, 10:
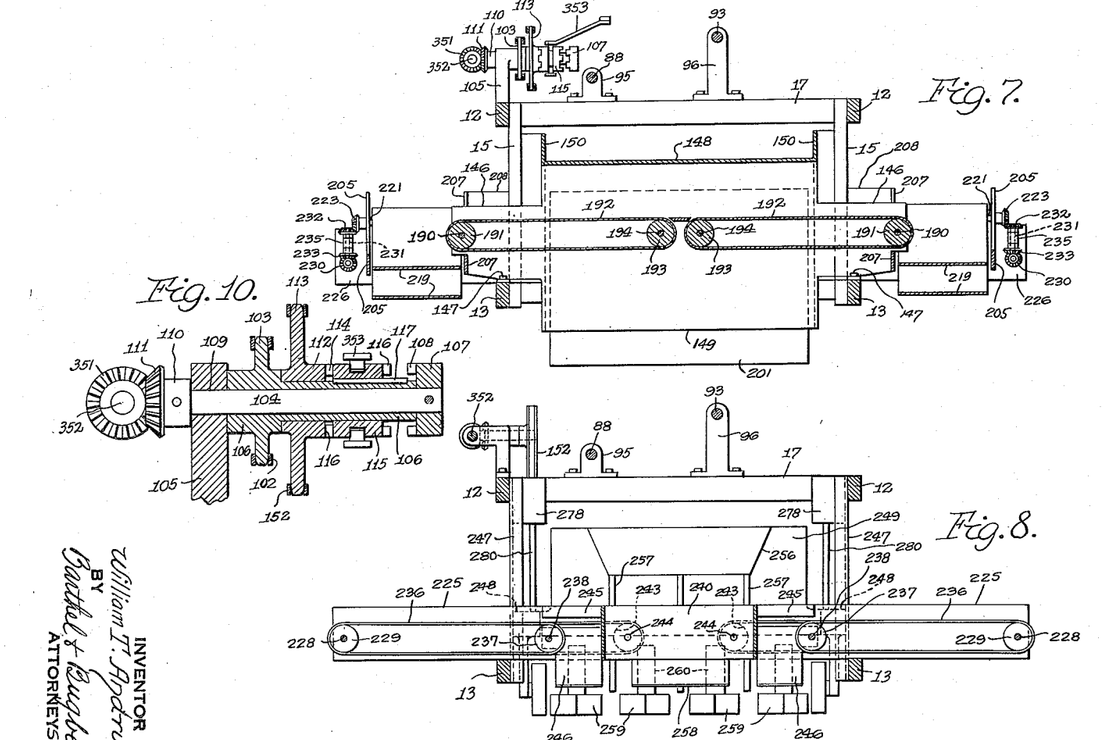
Figure 7 is a vertical cross sectional view taken on line 7—7 of Figure 2 looking in the direction of the arrows and illustrating the discharge chute for depositing the top soil in advance of the land roller so as to pack the same within a trough or pathway formed by a scoop or shovel for elevating the subsoil.
Figure 8 is a vertical cross sectional view taken on line 8—8 of Figure 2 looking in the direction of the arrows and illustrating the conveying apparatus for directing the subsoil to a location rearwardly of the land roller so as to be deposited on the previously deposited top soil.
Figure 10 is a vertical cross-sectional view taken on line 10—10 of Figure 1 looking in the direction of the arrows and illustrating a clutch interposed between the power source and the two sets of soil conditioning, treating and planting or seeding apparatus to facilitate operation of one set when the wheel frame is being moved in a predetermined direction.

Arranged rearwardly of the transversely extending vertical plate 208 is a similar plate or frame member 224 the ends of which extend laterally from each side of the implement frame as at 225 to co-operate with similar extensions 226 on the ends of the transversely extending vertical plate 208 so as to support conveyor roller shafts 228 (Figure 8). Conveyor rollers 229 are mounted on the shafts 228 and said shafts are connected with the bevel gears 223 on the ends of the conveyor roller shafts 221 (Figure 2) through the medium of a bevel gear 230 and a vertical shaft 231 which is fitted on one end with a bevel gear 232 meshing with the bevel gear 223, and on the outer end with a bevel gear 233 in mesh with the bevel gear 230. The rotary shaft 231 is journaled in a suitable bearing support 235 secured to the vertically extending transversely arranged plate 208.

Arranged over one end of the conveyor roller 229 is a conveyor apron 236 (Figure 9) which extends inwardly and is arranged over a conveyor roller 237 supported on a short shaft 238 extending through a bearing opening in the transversely extending vertical plate 208 and through a bearing opening in a supporting plate 239 which extends laterally from a frame plate 240 spaced from and secured to the transversely extending vertical plate 208 by frame members 241.

Arranged in side by side relationship with the inwardly directed conveyor aprons 236 is a pair of conveyor aprons 242 (Figure 1) which are likewise trained over the conveyor rollers 229 and have their inner ends trained over conveyor rollers 243 mounted on shafts 244 which are arranged with one end extending through a suitable bearing opening in the plate 240 while the opposite end is journaled in a suitable bearing opening in the transversely extending vertical plate 225. Thus it will be seen that the subsoil will be elevated by the shovel 167 and endless conveyor apron 176 so as to be deposited upon the endless conveyor aprons 192 and directed laterally to the rearwardly and upwardly extending endless conveyor aprons 219 so as to be finally directed inwardly by the pairs of endless conveyor aprons 236 and 242 and thereby deposited rearwardly of the land roller 201 on top of the surface soil which had been previously packed and rolled by said land roller 201. The frame 240 is provided with laterally extending projections 245 which provide division plates between the conveyors 236 and 242 so that a portion of the subsoil will be deposited adjacent the end of the pathway while the remaining portion will be directed inwardly and will be deposited in a center row between the subsoil deposited by the endless conveyor aprons 236. Depending from the laterally extending projection 239 on opposite sides of the frame 240 is a baffle wall 246 which is intended to direct the subsoil conveyed inwardly by the endless conveyor aprons 236 in a slightly forward direction as it falls by gravity over the end of the endless conveyor aprons 236 over the rollers 237.

Figure 1:
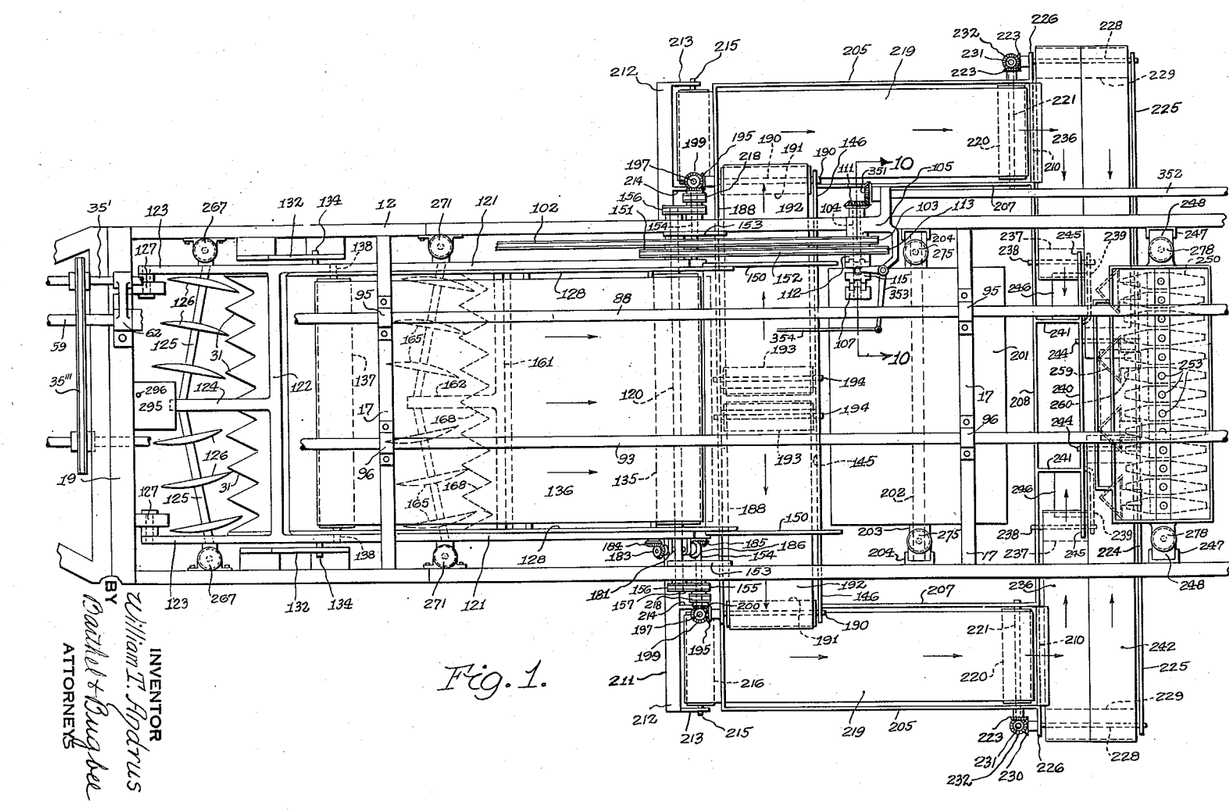
Figure 1 is a top plan view of one end portion of the farming apparatus and mechanism showing the general arrangement of the various parts and the manner in which the soil treating and conditioning apparatus is arranged.

Extending between the side rails 12 and 13 of the implement frame rearwardly of the endless conveyor aprons 236 and 242 is a pair of vertical guide bars 247 which are secured in place by bolts or the like and said guide bars are channel-shaped and are adapted to receive guide blocks 248 carried by the end walls of a seed hopper 249 (Figures 1 and 2). A series of seed drills 250 are pivotally mounted to a bracket 251 carried by the slide block 248 and said seed drills 250 are pivoted to the bracket as at 252 to oscillate thereabout. The bottom wall of the seed hopper 249 is provided with a series of apertures 253 which may be controlled by a slide valve and said apertures are connected to the various grain or seed drills 250 by flexible tubes 255.

Secured to the front wall of the seed hopper 249 is an auxiliary hopper 256 which may contain a quantity of fertilizing material so as to be distributed in advance of the seed or grain drills 250 by means of a dispensing pipe 257 which has its lower or discharge end arranged in spaced relation from the land surface being cultivated.

Extending downwardly from the transversely extending vertical plate 225 is a deflector baffle 258 which is adapted to direct the subsoil carried inwardly by the endless conveyor aprons 242 slightly forwardly in advance of a series of triangular-shaped spreader blocks 259 which are likewise suspended from the transversely extending vertical plate 225 by arm portions 260.

It will be seen (Figure 6) that the wheel frame 6 is arranged to support the structure above described at each end of the frame on opposite sides of the grain or seed hopper 249 so that when the farming apparatus is driven over a land surface in one direction, one set of apparatus at the forward end of the implement frame will be in operation, while the other set of apparatus rearwardly of the implement frame will be elevated out of ground engagement.

In order to accomplish the raising and lowering of the various disc harrows, conveyors and land rollers, a hydraulic system is provided and includes a pump of the inter-engaging impeller type 261 (Figure 11) which is adapted to be driven by the motor 37 by means of a shaft 262 having a bevel gear wheel 263 which is in mesh with a bevel gear wheel 264 on the power shaft 44 (Figure 3). The pump 261 (Figure 11) has its discharge side connected by means of a pipe line 265 to a manifold pipe 266. It is intended to provide a pair of manifold pipes, one along each side of the implement frame for supplying fluid under pressure to the control chamber of a series of cylinders likewise arranged on each side of the implement frame for elevating the implements thereon.

As shown in Figures 1 and 2, a cylinder 267 is secured to the top rails 12 of the implement frame and arranged directly above the disc harrow at the sides thereof. A piston is mounted on the cylinder as at 268 and has its plunger rod 269 connected to the side extensions 123 of the disc harrow supporting frame 121 by links 270.

Similarly, a pair of cylinders 271 are supported on the side bars 12 of the implement frame and are arranged so that their pistons 272 may be connected to the disc harrow supporting frame 158 by connecting the plunger rods 273 of said pistons with the side frame bars 158 by means of links 274. Pressure cylinders 275 are mounted on the upper frame rail 12 of the implement frame and are supported by the vertical guide members 214 so that their pistons 276 may be connected to the guide block 203 by means of a connecting rod 277.

Supported by the vertical channel guides 247 (Figure 8) are two spaced cylinders 278 each of which has its piston 279 connected to the slide block 248 of the grain or feed hopper 249 by means of a connecting rod 280 so that when the pistons 279 are forced upwardly in the cylinder 278, the grain or feed hopper 249 will be elevated as well as the grain drills 250, thereby permitting the implement frame to be transferred from one farm to another when all of the elements are elevated.

Figure 11:
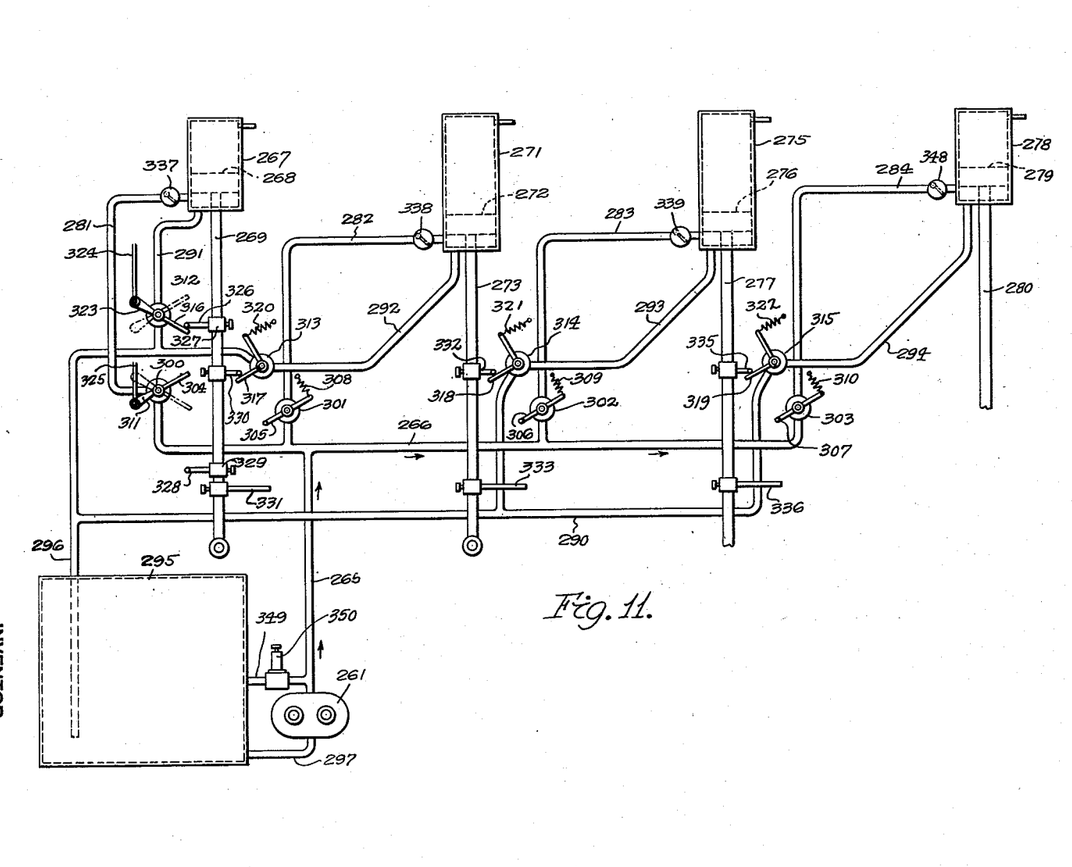
Figure 11 is a diagrammatic view of the hydraulic control system and apparatus employed for successively elevating the various soil treating, conditioning and planting or seeding apparatus for each end of the apparatus.

In Figure 11, the control system for the various cylinders and pistons is shown for only one end of the farm implement but it is to be understood that the disc harrows, supporting frames and conveying elements carried thereby will be controlled through the medium of a similar system particularly arranged and connected with a source of fluid 261 so as to permit both sets of implements to be operated by fluid pressure.

The manifold pipe 266 is provided with branch pipes 281, 282, 283 and 284 for supplying fluid under pressure to the cylinders 267, 271, 275 and 278 so as to force their respective pistons upwardly and thereby elevate the various mechanisms by the connecting rods 269, 273, 277 and 280. A return manifold 290 is adapted to be connected to the cylinders 267, 271, 275 and 278 by means of branch pipes 291, 292, 293 and 294, so as to return the fluid to a reservoir chamber 295 by means of a common discharge pipe 296. The fluid may again be circulated through a pump 261 by means of a pipe 297 which communicates with the reservoir tank 295 and is connected with the intake of the pump 261.

Interposed in the feeder pipes 281, 282, 283 and 284 is a series of valves 300, 301, 302 and 303 which are provided with operating levers 304, 305, 306 and 307 respectively. Coil springs 308, 309, and 310 are provided for normally holding the valves 301, 302 and 303 in a closed position while the valve 300 is provided with a manually controlled operating lever 311 which may be controlled from a vantage point on the implement frame on a suitable platform provided for the driver adjacent the motor 37.

Similarly, control valves 312, 313, 314 and 315 are interposed in the return branch lines 291, 292, 293 and 294 and said branch valves are provided with operating levers 316, 317, 318 and 319. Coil springs 320, 321 and 322 are provided for normally holding the control valves 313, 314 and 315 closed while the control valve 312 is adapted to be manually controlled by means of a manual operating lever 323 having a control rod 324 likewise extending to a vantage point accessible to the driver of the implement frame and preferably adjacent the platform near the motor 37.

Thus it will be seen that by manually opening the control valve 300 by the manual operating lever 311, through the medium of a control rod 325 similar to the control rod 324, fluid under pressure will be admitted to the under side of the piston 268 in the cylinder 267 so as to force the connecting rods 269 on each side of the implement frame upwardly and thus elevate the disc harrow supporting frame including the side bars 121, harrow discs 126 and apron elevator 136. As the connecting rod 269 travels upwardly, the valve 312 may be manually closed by reason of the fact that the trip finger 326 carried by a collar 327 and secured to the connecting rod 269 will be moved upwardly out of the way of the control lever 316. Similarly, a trip arm 328 is secured to the connecting rod 269 by means of a collar 329 surrounding the connecting rod at the lower end thereof which is adapted to engage the control lever 304 when the piston 268 has reached the limit of its upward travel so as to close the control valve 300. Also secured to the connecting rod 269 of each piston 267 is a trip arm 330 which is adapted to move upwardly with the connecting rod and move away from the control lever 317 so as to permit the spring 320 to close the return valve 313. Simultaneously, a trip arm 331, likewise on the connecting rod 269 will move upwardly and engage the trip arm 305 of the control valve 301 and thereby open said valve and permit fluid under pressure to flow from the manifold pipe 266 through the supply pipe 282 to the cylinder 271 and thereby elevate the piston 272 therein as well as the connecting rod 273 thereof. As the lower end of the connecting rod 273 is connected to the disc harrow supporting frame 158, said frame will be elevated at substantially the same point in the pathway of the implement frame travel as the disc harrow supporting frame 121 was elevated. As the disc harrow supporting frame 158 is raised, the trip arm 332 on the connecting rod 273 will move away from the control lever 318 and permit the coil spring 321 to close the return valve 314 of the cylinder 275 so that continued upward travel of the connecting rod 273 will bring the trip arm 333 into engagement with the control lever 306 of the supply valve 302 and thereby admit fluid under pressure to the cylinder 275 so as to elevate its piston 276 and the connecting rod 277 connected thereto. The connecting rod 277 is secured at its lower end to the slide blocks 203 of the land roller 201 so that upon admission of fluid under pressure to the cylinder 275, the land roller 201 will be elevated at substantially the same position along the pathway of travel of the implement frame as the disc harrow supporting frame 158 is elevated. During the upward movement of the connecting rod 277, a trip arm 335 thereon will move away from the control lever 319 of the return valve 315 and permit the coil spring 321 to close said valve so that when fluid under pressure is admitted to the cylinder 278, by means of the trip arm 336 on the connecting rod 277 engaging the control lever 309 of the control valve 303, the piston 279 of said cylinder will be elevated and thereby elevate the seed or grain hopper 249, as well as the grain drills 250.

It will thus be seen that after fluid under pressure has been admitted to the cylinder 267 by manually manipulating the control valve 300 to initiate elevation of the disc harrow supporting frame 121, fluid under pressure will be successively admitted to the cylinders 271, 275 and 278 so as to elevate the disc harrow supporting frame 158 and endless apron conveyor 176 as well as the land roller 201 and seed or grain hopper 249, one after the other at substantially the same point along the pathway over which the implement frame is travelling when approaching the end of the plot being treated or conditioned as well as planted or seeded.

Check valves 337, 338, 339 and 340 are interposed in the supply lines or branch pipes 281 to 284 inclusive so as to prevent fluid escape from the cylinders 267, 271, 275 and 278 after they have been successively elevated.

A by-pass pipe 349 is connected to the supply line 265 on the discharge side of the pump 269 and communicates with the reservoir tank 295 and said by-pass pipe is provided with a by-pass valve 350 which is adapted to open upon the building up of excessive pressures in the system and thereby permit the fluid discharge from the pump 261 to be returned to the reservoir 295.

The fluid pressure control valves 300 to 303 inclusive are normally closed while the return control valves 312 to 315 inclusive are normally open and, as mentioned above, the fluid pressure control valve 300 and return control valve 312 are manually operable to permit the valves to be moved to either an open or a closed position.

Since the fluid pressure control system and apparatus for only one end of the soil treating, conditioning and seed planting apparatus has been described, it is to be understood that the same structure and system will be provided for the opposite end of the apparatus and that when it is desired to elevate both sets of apparatus, the manual control valve for each set may be operated to cause the various implements to be successively elevated out of ground engagement to permit the implement frame to be moved from one location to another.

For a consideration of the operation of the apparatus, it will be assumed that the motor 37 has been started and the steering gear controlled so that the traction wheels 9 and 10 at the opposite ends of the implement frame will be arranged to steer the frame along a straight-line path. First the disc harrow supporting frame 121 is lowered manually to a predetermined ground level as shown in Figure 2 so that the harrow discs 126 will remove the top soil. Next the harrow supporting frame 158 is lowered as the same reaches a point where the first harrow frame was lowered so that the harrow discs 165 will remove the subsoil. After the disc harrow frames have been lowered and the ground roller 201 as well as the feed or grain hopper 249 has been lowered to the proper position, the manual operating handle 51 is shifted to cause one of the bevel gears 49 to engage the bevel gear 57 and thereby impart rotation to the shaft 59 and thus drive the traction wheels 9 and 10 by reason of the fact that both sets of traction wheels are connected by the shaft 88. As the implement frame moves along the ground surface, the top soil is removed by the harrow discs 126 and conveyed upwardly on the endless apron conveyor 136 so as to fall by gravity down the chute 148 directly in front of the land roller 201 and in the trench or path from which the subsoil has been removed by the harrow discs 165 and the following shovel or scoop 167. The subsoil removed by the shovel 167 and cut by the harrow discs 155 is elevated by the endless conveyor 176 with the aid of the cleat carrying endless conveyor 174 so that the subsoil will be deposited on the endless conveyor aprons 192 and directed outwardly to the endless conveyor aprons 219 and thence inwardly by the endless conveyor aprons 236 and 242 toward the center of the implement frame and in back of the land roller 201. Thus the subsoil is deposited on top of the surface soil which has previously been rolled and smoothed by the land roller 201 so as to provide a thin layer of soil on the treated surface for being planted or seeded. The triangular-shaped spreader shoes 259 distribute the loose unpacked subsoil evenly over the packed layer of top soil deposited forwardly of the land roller 201 so that one set of the grain drills 250 may pass therethrough and permit the seed to be fed therethrough and deposited in a row or series of rows directly in back of the triangular-shaped spreader shoes 259.

When the end of the pathway has been reached, the various implements at the then forward end of the machine are elevated in succession by manipulating the control valves 300 and 312. The steering wheel 35″ is then rotated to swing the wheel yokes 26 around the axes of their pivot shafts 73 to shift the wheels 28 into lateral planes. A power connection is then closed between the motor 37 and the gears 64 so that these rotate the wheels 28 at both ends of the machine, shifting the entire machine laterally into a position parallel to the pathway just treated, and ready to treat a new pathway by moving the machine in the opposite direction. The steering wheel 35″ is then rotated to swing the planes of the wheels 28 back into a lengthwise direction of the machine whereupon the motion of the frame is reversed by shifting the manual control lever 51 as well as the clutch collar 115 (Figure 10) so as to drive the other set of implements through the sprocket 103, shaft 104, bevel gear 111 and bevel gear 351, and shaft 352 extending longitudinally and arranged to be drivingly connected to a sprocket wheel similar to the sprocket wheel 151 on the transversely extending rotary shaft 120. The control lever 353 for the clutch collar 115 may be provided with a control rod 354 extending to a vantage point of operation within easy access of the operator.

With the motion of the implement frame reversed and the apparatus at the other end of the machine in operation, similarly to the apparatus above described, the wheel frame may be moved in a reverse direction after being shifted laterally by controlling the steering mechanism through the medium of the shaft 35 and various gear wheels to turn the traction wheels 9 and 10 at right angles so that the entire frame may be shifted laterally to a new pathway parallel with the one previously conditioned, whereupon the steeling mechanism is again operated to arrange the traction wheels 9 and 10 in a direction parallel with the path to be conditioned or treated.

When the implement frame has been laterally shifted, the frame is again set in motion and power applied to the traction wheels by the motor 37 to cause the implement frame to travel along another pathway with one set of apparatus thereof in ground engagement so as to treat and condition the soil as above pointed out.

It will thus be seen that when the implement frame has reached the end of the pathway along the land surface being treated, the set of implements on the forward end according to the direction of travel will be successively elevated as they reach a common reference point. After the implements have thus been elevated, the entire implement frame is shifted laterally a sufficient distance so that the new pathway to be made or soil to be treated and conditioned will not overlap the pathways previously conditioned and planted. When the implement frame has been shifted laterally by the steering mechanism and the steering mechanism again set and positioned so as to permit the movement of the implement frame in a reverse direction, the implements are lowered on the forward end of the implement frame (previously the rear end) into ground engagement so that when power is applied to the traction wheels 9 and 10, upon manipulation of the control lever 51 as well as the control lever 353 for the clutch collar 115, the implement frame will be propelled forwardly and the various implements will be driven through the medium of the shaft 352 and motor 37. In order to raise and lower the grain drills 250, which are common to both sets of the oppositely-facing excavators and conveyors, it will be evident that the cylinders 278 (Figure 11) will be connected to both hydraulic circuits, valves being provided to shut off one circuit while the cylinders 278 are connected to the other circuit. The grain drills 250 rock about their pivots 252 automatically as the machine reverses its direction, thus requiring no special means of reversal. Obviously a second set of spreader blocks 259 is mounted on the opposite side of the grain drills 250 from the first set shown in Figure 2, but one set of blocks 259 does not interfere with the other set during the travel of the machine in either direction, since the ground has been substantially leveled by the first set before it encounters the second set, except for the slight furrows made by the grain drills 250.

The implement frame may thus be moved to and fro over a land surface without necessitating turns at the end of each pathway or strip of soil being conditioned and treated by simply manipulating the various control elements so as to set into operation the implements on the forward portion of the machine, according to the direction of travel and arranging the same so that they are in ground engagement with the set of implements on the rear end of the frame in an elevated position.

In the modified form of suspension means shown in Figure 12, the implement frame including the side frame bars 12a and 13a is identical in construction with the frame illustrated and described in connection with Figures 1 to 11 inclusive and the wheel supporting frame includes top and bottom frame bars 20a and 21a connected by end bars 14b and 22a. The wheels 9a are mounted in the wheel forks 26a and are connected for being driven and steered as pointed out in connection with the wheels 9 and 10 in Figures 1 to 11 inclusive. In Figure 12 there is shown a yielding connection interposed between the implement frame and the wheel supporting frame and secured to the vertical frame bars 14a of the implement frame is a pair of link members 400 which are pivotally affixed to the vertical frame bars 14a and have their other ends similarly attached to the upright 14b at each side of the wheel supporting frame. A pair of projections 401 and 402 are secured to the implement frame end bars 14a and arranged therebetween and secured to the upright frame bars 14b of the wheel supporting frame is a projection or abutment 403. Coil springs 404 and 405 are mounted on opposite sides of the projection 403 and have their ends disposed in abutting relation with the projections 401 and 402 respectively to thereby yieldingly support the implement frame and absorb shocks while the soil conditioning and treating implement is traveling over rough ground or surfaces. It is intended to support both ends of the implement frame by the yielding frame connection illustrated in Figure 12 and since both ends are identical, a description of one will suffice for both ends.

It is to be understood that the forms of the invention herewith shown and described are to be taken as preferred embodiments thereof, and that various changes may be made in the shape, size and arrangement of parts without departing from the spirit of the invention or the scope of the subjoined claims.

What I claim is:

1. In a land treating and soil conditioning apparatus comprising a traction frame, laterally steerable wheel supports pivotally mounted on said frame at opposite ends thereof, wheels on said supports, means for steering said supports and wheels laterally of said frame, a top soil excavator carried by said frame for removing top soil from a land surface, a land roller carried by said frame, a subsoil excavator for removing sub-surface soil positioned on said frame rearwardly of said top soil excavator, a top soil conveyor adjacent said top soil excavator for depositing the top soil in front of said land roller in the pathway formed by the subsoil excavator, and a subsoil conveyor for carrying said subsoil to a position rearwardly of said land roller for being deposited on the top soil.

2. In a land treating and soil conditioning apparatus comprising a traction frame, laterally steerable wheel supports pivotally mounted on said frame at opposite ends thereof, wheels on said supports, means for steering said supports and wheels laterally of said frame, a top soil excavator carried by said frame for removing top soil from a land surface, a land roller carried by said frame, a subsoil excavator for removing sub-surface soil positioned on said frame rearwardly of said top soil excavator, a top soil conveyor adjacent said top soil excavator for depositing the top soil in front of said land roller in the pathway formed by the subsoil excavator, a subsoil conveyor for carrying said subsoil to a position rearwardly of said land roller for being deposited on the top soil, an elevator connected to said land roller to raise and lower said roller, and mechanism for operating said elevator.

3. In a farming implement, in combination, an implement frame, a set of laterally-spaced rotary soil cutting discs mounted forwardly on said frame, a top soil excavator mounted on the implement frame rearwardly of said discs for removing surface soil containing vegetable matter such as stubble and the like, a subsoil excavator mounted on the frame rearwardly of said top soil excavator for removing sub-surface soil, a top soil conveyor mounted adjacent said top soil excavator for depositing the surface soil in the pathway formed by the subsoil excavator, and a subsoil conveyor mounted adjacent said subsoil excavator for conveying the sub-surface soil rearwardly for being deposited on the previously deposited layer of surface soil.

4. In a farming implement, in combination, an implement frame, a set of laterally-spaced rotary soil cutting discs mounted forwardly on said frame, a top soil excavator mounted on the implement frame rearwardly of said discs for removing surface soil containing vegetable matter such as stubble and the like, a subsoil excavator mounted on the frame rearwardly of said top soil excavator for removing sub-surface soil, a top soil conveyor mounted adjacent said top soil excavator for depositing the surface soil in the pathway formed by the subsoil excavator, a subsoil conveyor mounted adjacent said subsoil excavator for conveying the sub-surface soil rearwardly for being deposited on the previously deposited layer of surface soil, and a second set of laterally-spaced rotary soil cutting discs mounted rearwardly of said first set and forwardly of said subsoil excavator.

5. In a farming implement, in combination, a wheeled implement frame having combined steering and traction wheels mounted at opposite ends thereof, a prime mover on said frame drivingly connected to said wheels, a seed planter mounted centrally of said frame for dispensing and planting seed, oppositely-facing top soil excavators mounted at the opposite ends of the frame for removing top soil of a predetermined depth, oppositely-facing subsoil excavators mounted rearwardly of said top soil excavators on the frame for removing sub-soil from the pathway formed by the removal of the top soil, oppositely-facing top soil conveyors mounted between their respective top soil and subsoil excavators for conveying the top soil to a position to be deposited between the respective subsoil conveyor and the seed planter, oppositely-facing subsoil conveyors mounted between their respective subsoil excavators and said seed planter for conveying the sub-soil to a position adjacent said seed planter, fluid pressure motors connected to said excavators and conveyors to raise and lower the same, and a pressure fluid supply circuit connected to said motors, said circuit including a source of pressure fluid and control valves operative to selectively raise the excavators and conveyors facing in one direction and to lower the excavators and conveyors facing in the opposite direction.

6. In a farming implement, in combination, a wheeled implement frame having combined steering and traction wheels mounted at opposite ends thereof, a prime mover on said frame drivingly connected to said wheels, a seed planter mounted centrally of said frame for dispensing and planting seed, oppositely-facing top soil excavators mounted at the opposite ends of the frame for removing top soil of a predetermined depth, oppositely-facing subsoil excavators mounted rearwardly of said top soil excavators on the frame for removing subsoil from the pathway formed by the removal of the top soil, oppositely-facing top soil conveyors mounted between their respective top soil and subsoil excavators for conveying the top soil to a position to be deposited between the respective subsoil conveyor and the seed planter, oppositely-facing subsoil conveyors mounted between their respective subsoil excavators and said seed planter for conveying the sub-soil to a position adjacent said seed planter, elevators connected to said excavator and conveyors to raise and lower the same and mechanism for actuating said elevators, said mechanism including control devices operative to selectively raise the excavators and conveyors facing in one direction and to lower the excavators and conveyors facing in the opposite direction.

7. In a farming implement, in combination, a wheeled implement frame having combined steering and traction wheels mounted at opposite ends thereof, a prime mover on said frame drivingly connected to said wheels, a seed planter mounted centrally of said frame for dispensing and planting seed, oppositely facing top soil excavators mounted at the opposite ends of the frame for removing top soil of a predetermined depth, oppositely-facing subsoil excavators mounted rearwardly of said top soil excavators on the frame for removing subsoil from the pathway formed by the removal of the top soil, oppositely-facing top soil conveyors mounted between their respective top soil and subsoil excavators for conveying the top soil to a position to be deposited between the respective subsoil conveyor and the said planter, oppositely-facing subsoil conveyors mounted between their respective subsoil excavators and said seed planter for conveying the subsoil to a position adjacent said seed planter, elevators connected to each of said excavators and conveyors to raise and lower the same, and mechanism for actuating said elevators, said mechanism including control devices operative to selectively raise the excavators and conveyors facing in one direction in succession, and to lower the excavators and conveyors facing in the opposite direction.

8. In a farming implement, in combination, a wheeled implement frame having combined steering and traction wheels mounted at opposite ends thereof, a prime mover on said frame drivingly connected to said wheels, a seed planter mounted centrally of said frame for dispensing and planting seed, oppositely facing soil loosening devices mounted on opposite sides of said seed planter, elevators connected to each of said soil loosening devices and to said seed planter to raise and lower the same, and mechanism for actuating said elevators, said mechanism including control devices operative to selectively raise the soil loosening device facing in one direction and to lower the soil loosening device facing in the opposite direction and also to selectively raise and lower said seed planter.

WILLIAM T. ANDRUS.

REFERENCES CITED

The following references are of record in the file of this patent:

UNITED STATES PATENTS

| Number | Name | Date |
| --- | --- | --- |
| 1,319,936 | Wentworth | Oct. 28, 1919 |
| 1,331,044 | Bartholomew | Feb. 17, 1920 |
| 1,402,822 | Wolff | Jan. 10, 1922 |

FOREIGN PATENTS

| Number | Country | Date |
| --- | --- | --- |
| 365,566 | Germany | Apr. 18, 1923 |